United States Patent
Sade et al.

(10) Patent No.: US 9,699,261 B2
(45) Date of Patent: Jul. 4, 2017

(54) MONITORING SESSIONS WITH A SESSION-SPECIFIC TRANSIENT AGENT

(71) Applicant: Cyber-Ark Software Ltd., Petach-Tikva (IL)

(72) Inventors: Yair Sade, Herzlia (IL); Erez Breiman, Tel-Aviv (IL); Ran Stotsky, Tel-Aviv (IL); Andrey Dulkin, Herzlia (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 256 days.

(21) Appl. No.: 14/154,200

(22) Filed: Jan. 14, 2014

(65) Prior Publication Data

US 2015/0200821 A1   Jul. 16, 2015

(51) Int. Cl.
| | | |
|---|---|---|
| G06F 15/173 | (2006.01) | |
| H04L 29/08 | (2006.01) | |
| H04L 29/06 | (2006.01) | |
| H04L 12/26 | (2006.01) | |

(52) U.S. Cl.
CPC .............. *H04L 67/28* (2013.01); *H04L 43/12* (2013.01); *H04L 43/14* (2013.01); *H04L 63/1408* (2013.01); *H04L 63/20* (2013.01); *H04L 67/141* (2013.01); *H04L 67/22* (2013.01); *H04L 43/08* (2013.01)

(58) Field of Classification Search
CPC ..... H04L 63/20; H04L 63/10; H04L 63/0281; H04L 63/0428; H04L 63/0823; H04L 43/08; H04L 9/3268
See application file for complete search history.

(56) References Cited

U.S. PATENT DOCUMENTS

| | | | |
|---|---|---|---|
| 6,286,104 B1 | 9/2001 | Buhle et al. | |
| 6,986,040 B1 | 1/2006 | Kramer et al. | |
| 2007/0294209 A1* | 12/2007 | Strub | H04L 63/102 |
| 2008/0196101 A1 | 8/2008 | Sade et al. | |
| 2011/0321120 A1 | 12/2011 | Saxena et al. | |
| 2012/0124205 A1 | 5/2012 | Muret et al. | |
| 2013/0191631 A1* | 7/2013 | Ylonen | H04L 63/1483 |
| | | | 713/153 |
| 2014/0181939 A1 | 6/2014 | Bonnell | |
| 2015/0271162 A1 | 9/2015 | Dulkin et al. | |

(Continued)

FOREIGN PATENT DOCUMENTS

| | | |
|---|---|---|
| WO | WO 2013/088212 | 6/2013 |
| WO | WO 2014/064686 | 5/2014 |

OTHER PUBLICATIONS

"https://web.archive.org/web/20140209071512/http://hitachi-id.com/resource/concepts/privileged-access-management.html".*

(Continued)

*Primary Examiner* — Chirag R Patel
*Assistant Examiner* — Rachel J Hackenberg (57) ABSTRACT

A method of monitoring a session on a target system includes receiving from a user client a user request to open a session with the target system. A session-specific transient agent for monitoring the session is installed onto the target system. The session is established between the user and the target system over a communication network. The transient agent monitors the session, collects data of events occurring on the target system during the session. The transient agent is terminated when the session ends.

28 Claims, 5 Drawing Sheets

(56) References Cited

U.S. PATENT DOCUMENTS

2016/0006712 A1   1/2016   Sade et al.
2016/0006765 A1   1/2016   Shem Tov et al.

OTHER PUBLICATIONS

Official Action Dated Feb. 26, 2015 From the US Patent and Trademark Office Re. U.S. Appl. No. 14/217,649.
Applicant-Initiated Interview Summary Dated Jun. 10, 2015 From the US Patent and Trademark Office Re. U.S. Appl. No. 14/217,649.
European Search Report and the European Search Opinion Dated May 15, 2015 From the European Patent Office Re. Application No. 15150412.3.
Official Action Dated Jun. 17, 2015 From the US Patent and Trademark Office Re. U.S. Appl. No. 14/217,649.
Centrify Corporation "Centrify Server Suite: Unified Identity Management and Audit Across On-Premise and Cloud-Based Windows, Linux, and UNIX Servers", Data Sheet, Centrify Corporation, 2 P., 2014.
Citrix "Citrix XenServer. Industry-Leading Open Source Platform for Cost-Effective Cloud, Server and Desktop Virtualization", Citrix Systems inc., Product Overview, 7 P., 2013.
CyberArk "Privileged Identity Management Suite 7.0", Cyber-Ark Software, Ltd., Version 7.2, 4 P., Aug. 23, 2013.
CyberArk "Privileged Threat Analytics™", CyberArk Software Ltd., 2 P., 2013.
Gartner PAM "Beyondtrust: PowerBroker Identity Services for Active Directory Bridging. Extend Microsoft® Active Directory Authentication and Single-On Capabilities + Group Policy Configuration Management to UNIX, Linux and Mac Systems", Whitepaper, Gartner PAM Market Guide, 2 P., 2014.
Khan et al. "Oracle® Identity Manager: Connector Guide for UNIX, Release 11.1.1, E17694-06", Oracle, 128 P., Feb. 2014.
Observelt "Are You Monitoring Your Fastest Growing Threat? User-Based Threats: Identifying Suspicious Activities and Understanding Intent", Observeit, Overview Brochure, 2 P., Jan. 26, 2015.
Oracle "Oracle Identity Manager 11g", Data Sheet, Oracle, 3 P., 2011.
Wikipedia "Remote Desktop Protocol", Wikipedia, the Free Encyclopedia, 7 P., Last Modified Sep. 16, 2014.
Citrix "XenApp Smart Auditor", Citrix eDocs, Jan. 23, 2014.
CyberArk "Discovery & Audit", CyberArk DNA, Product Discription Brochure, Cyber-Ark Software Company, 2 P., Nov. 2013.
Cyber-Ark "Application Identity Manager™", Cyber Ark Software, Ltd., Datasheet, 2 P.
Cyber-Ark "Application Password Management", Cyber-Ark Software Ltd., Datasheet, 2 P., Feb. 2007.
Cyber-Ark "Enterprise Password Vault™ 4.5", Cyber-Ark Software Ltd., Brochure, 4 P., Nov. 2007.
Cyber-Ark "On-Demand Privileges Manager™ for Unix/Linux", Cyber Ark Software, Ltd., Datasheet, 2 P.
Cyber-Ark "On-Demand Privileges Manager™ for Windows", Cyber Ark Software, Ltd., Datasheet, 2 P., 2009.
Cyber-Ark "On-Demand Privileges Manager™", Cyber-Ark Software Ltd., Brochure, 2 P., Apr. 2010.
Cyber-Ark "Privileged Identity Management 5.0", Cyber-Ark Software Ltd., Brochure, 4 P., Apr. 2009.
Cyber-Ark "Privileged Identity Management Suite 7.0", Cyber-Ark Software, Ltd., PIM Brocure, 4 P., 2010.
Cyber-Ark "Privileged Session Management Suite 7.0", Cyber Ark Software, Ltd., PSM Brochure, 4 P., 2010.
Cyber-Ark "Privileged Session Manager™", Cyber-Ark Software Ltd., Datasheet, 2 P., Mar. 2009.
Jungles et al. "Mitigating Pass-the-Hash (PtH) Attacks and Other Credential Theft Techniques. Mitigating the Risk of Lateral Movement and Privilege Escalation", TwC Next, Microsoft Corporation, p. 1-72, 2012.
National Security Agency "Spotting the Adversary With Windows Event Log Monitoring", National Security Agency/Central Security Service, Information Assurance Directorate of the United States of America, p. 1-67, Feb. 28, 2013.
ObserveIT "ObserveIT Enterprise User Activity Monitoring", ObserveIT, Product Documentation, Version 5.6.8, Jan. 23, 2014.
European Search Report and the European Search Opinion Dated Nov. 6, 2015 From the European Patent Office Re. Application No. 15173242.7.
Official Action Dated Nov. 6, 2015 From the US Patent and Trademark Office Re. U.S. Appl. No. 14/217,649.
Official Action Dated May 13, 2016 From the US Patent and Trademark Office Re. U.S. Appl. No. 14/217,649.
Wikipedia "Processor", From Wikipedia, The Free Encyclopedia, 2.P, May 7, 2016.
Applicant-Initiated Interview Summary Dated Feb. 23, 2016 From the US Patent and Trademark Office Re. U.S. Appl. No. 14/217,649.

* cited by examiner

MONITORING SESSIONS WITH A SESSION-SPECIFIC TRANSIENT AGENT

FIELD AND BACKGROUND OF THE INVENTION

The present invention, in some embodiments thereof, relates to computer security, and, more particularly, but not exclusively, to controlling and monitoring sessions on target systems.

Monitoring and control of access to sensitive data and applications is a major computer security concern for businesses and other organizations. This issue is particularly critical for privileged accounts, in which the user (such as a system administrator) has access to multiple accounts and network services. A common challenge for an organization is how to monitor user activity and to control privileged, shared or sensitive credentials in order to prevent misuse and abuse.

There are solutions available to address these issues. Such solutions include:

I) Agent-based monitoring and access control—Agents are pre-installed on target systems to monitor and control access upon the target systems. The agents report to a centralized server using a dedicated communication channel. This solution requires a high investment of resources, since the installer (e.g. target system owner organization) needs to deploy, manage, upgrade, patch and monitor the agents. The pre-installed agents are continuously active on the target systems and consume target system resources. Moreover, a user with administrative access to the system may potentially circumvent and bypass the agent monitoring.

II) Privileged Session Management Proxies—Sessions are initiated, monitored and controlled by a proxy server which serves as an intermediate between the user and the target system. The Privileged Session Management Proxy may also provide Privileged Single Sign-On. This approach may be integrated with a Privileged Account Management System (PAMS) which authenticates and manages user credentials in coordination with the proxy. However in this approach, monitoring is done on the proxy and therefore lacks the context of what is actually running on the target system (e.g. which processes, windows titles, etc. are available to the user).

III) Client-side monitoring—Monitoring is performed on the client system which provides no control over the session, and lacks the context of what is actually running on the target system. An additional disadvantage is that a user with administrative rights on the client workstation may bypass the monitoring.

SUMMARY OF THE INVENTION

According to an aspect of some embodiments of the present invention, users interact with target systems via a session monitoring system operating as a proxy server. When the user requests a data session with a target system, the session monitoring system injects a session-specific transient agent onto the target system prior to establishing the session. The transient agent performs access control and/or monitoring (contextual and possibly non-contextual) from within the target system. Information collected by the transient agent may be communicated back to the session monitoring system, possibly over the main communication channel used for the session. The transient agent is active only for the duration of the session and is terminated upon termination of the user session.

In some embodiments of the invention, transient agent monitoring and access control are integrated with PAMS thus providing the further benefits of PAMS (non-disclosure of credentials, connection to privileged accounts, etc.).

According to an aspect of some embodiments of the present invention there is provided a method of monitoring session events on a target system. The method includes: receiving from a user client a user request to open a session with the target system, installing a session-specific transient agent for monitoring the session onto the target system, establishing the session between the user and the target system over a communication network, and monitoring the session by the transient agent to collect information of events occurring upon the target system during the session. The transient agent is terminated in response to a termination of the session.

According to some embodiments of the invention, the method further includes routing the session is via a proxy server so as to isolate between the user client and the target system.

According to some embodiments of the invention, the method further includes monitoring transient agent activity and triggering action on the target system in accordance with the transient agent activity. According to some embodiments of the invention, the triggered action includes at least one of: alerting, terminating the session, pausing the session, reactivating the transient agent and general alert.

According to some embodiments of the invention, the method further includes monitoring transient agent activity and terminating the session if the transient agent is non-active.

According to some embodiments of the invention, the method further includes logging the collected information to enable at least one of real-time monitoring and later analysis of the events.

According to some embodiments of the invention, the method further includes comparing the collected information to a session policy and controlling the session to keep session events within limits of the session policy. According to some embodiments of the invention, the controlling is performed by the transient agent.

According to some embodiments of the invention, the method further includes monitoring the user client to collect information of events occurring upon the user client during the session, comparing information collected at both the target system and the user client to a session policy, and controlling the session to keep session events within limits of the session policy.

According to some embodiments of the invention, the method further includes terminating the session in response to session events which exceed the limits of the session policy. According to some embodiments of the invention, the terminating is performed by the transient agent.

According to some embodiments of the invention, communication with the transient agent is over a main communication channel established between the user client and the target system for the performance of the session.

According to some embodiments of the invention, the method further includes authenticating the user client prior to the establishing, determining respective user privileges for the session and controlling the session in accordance with the user privileges and the monitoring.

According to some embodiments of the invention, the transient agent is pre-installed on the target system, and the installing comprises activating the transient agent for duration of the session.

According to some embodiments of the invention, the events upon which information is collected include at least one of: processes launched, window titles, key strokes, access to files and/or registry, mouse movements and clicks, text fields, command execution, OS system calls, application API calls and display content.

According to an aspect of some embodiments of the present invention there is provided a session monitoring system which includes: a processor, a session management module which establishes and terminates a session between a user client and a target system, and an agent management module which installs a session-specific transient agent for monitoring the session onto the target system upon initiation of the session and terminates the transient agent upon termination of the session. The transient agent monitors the session upon the target system to collect information of events occurring upon the target system during the session.

According to some embodiments of the invention, the agent management module receives the collected information from the transient agent and the session management module compares the collected information to a session policy and controls the session in accordance with the collected information.

According to some embodiments of the invention, the transient agent reports the collected information to the agent management module for at least one of: continuously, periodically, upon query by a proxy server, when a specified event occurs, when an attempt to exceed the session policy occurs or when suspicious activity is detected.

According to some embodiments of the invention, the transient agent controls the session upon the target system in accordance with the collected information and a session policy.

According to some embodiments of the invention, the transient agent controls at least one of which files are accessed, which processes are launched, which network assets and/or addresses are accessed and/or which protocols are used, which registry keys are accessed, which windows are opened, which system calls are executed, which application APIs are run, and what information is displayed and/or presented to the user.

According to some embodiments of the invention, the session monitoring system runs on a proxy server isolating between the user client and the target system.

According to some embodiments of the invention, the session monitoring system runs on a user endpoint directly accessible to an initiator of the session.

According to some embodiments of the invention, the session monitoring system runs on an inline proxy server between the user client and the target system, and wherein the session is routed via the inline proxy server.

According to some embodiments of the invention, the session monitoring system runs on a terminal proxy, and wherein the terminal proxy further runs the user client such that an initiator of the session accesses the user client with a terminal protocol.

According to some embodiments of the invention, the system further includes an account management module which authenticates respective user credentials upon receipt of a user client request to establish a session. According to some embodiments of the invention, the account management module queries a privileged account management system (PAMS) to obtain session-specific user credentials for use during the session. According to some embodiments of the invention, the account management module establishes a session policy comprising user privileges for the session. According to some embodiments of the invention, the account management module establishes session-specific user credentials for use during the session.

According to some embodiments of the invention, communication between with the transient agent is over a main communication channel established with the target system for the performance of the session.

According to some embodiments of the invention, upon termination of the session the session management module triggers the agent management module to terminate the transient agent.

According to an aspect of some embodiments of the present invention there is provided a computer program product for monitoring a session on a target system. The computer program product includes: a computer readable storage medium, first program instructions to receive from a user client a user request to open a session with the target system, second program instructions to install a session-specific transient agent for monitoring the session onto the target system, third program instructions to establish the session between the user and the target system over a communication network, fourth program instructions to monitor the session by the transient agent so as to collect information of events occurring upon the target system during the session, and fifth program instructions to terminate the transient agent in response to a termination of the session. The first, second, third, fourth and fifth program instructions are stored on the computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to computer security, and, more particularly, but not exclusively, to controlling and monitoring sessions on target systems.

According to some embodiments of the present invention there are provided a system and method for contextual monitoring and granular access control of sessions between a user client and a target system, such as privileged sessions. A session-specific transient agent (also denoted herein a transient agent) is installed on the target system for the duration of the session, and optionally for a short uninstallation period after the duration of the session. The session-specific transient agent is active during the session and is terminated when the session closes. The transient agent monitors the session from within target system, collects information about events occurring on the target server during the session, and possibly returns the collected information back to the proxy between the target and user client. Thus access management and/or session control may be performed based on information gathered by the transient agent and/or based on a combination of information gathered at both the system side and at the transient agent side (i.e. the target system side).

As used herein the term "session" means the communication between the user client and the target system and the events and/or activities occurring on the target system in response to user client actions upon the target system (such as data storage, data retrieval or running an application on the target system).

In some embodiments, the session is established via a proxy in order to isolate the user client from the target system and from the credentials used for accessing the target system. The proxy may serve as a control point for the session and may also collect information about client-side activities. The proxy functionality may be incorporated in any place along the communication channel between the user client and target system for the session. Exemplary embodiments are presented in FIGS. 3A-3C.

As used herein the term "proxy" means an element (e.g. computer system, server or application) which acts as an intermediary between the user client and the target system.

As used herein the term "isolate" means that there is not a direct communication channel between the user client and the target system.

In some embodiments, while the session is running the proxy verifies that the transient agent is active on the target system. If the transient agent is not active appropriate action is taken. Such action may include alerting, reactivating the transient agent and/or terminating the session. This may ensure that target-side monitoring is performed for the duration of the session and to protect against attempts to bypass/circumvent the transient agent.

As described in detail below, some embodiments integrate additional security mechanisms (for example by confirmation of privileged user credentials, privileges, etc. . . . ), either independently or in communication with a PAMS.

As used herein the phrase "user client" means a computer application/program capable of accessing a separate computing entity (e.g. computer system, server, program, etc. . . . ). The user client may be controlled by a human user and/or by another computer entity.

As used herein the term "initiate" means the command input to the user client which causes the user client to request a session with the target system. As used herein the term "initiator" is the human user or computer entity/application inputting the initiate command to the user client.

As used herein the term "target system" means the computing entity accessed by the user client.

As used herein the phrase "communication channel" means the communication pathway along which data (e.g. data packets) are transmitted between the user client, the proxy and the target system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Method of Session Monitoring

Figure 1:
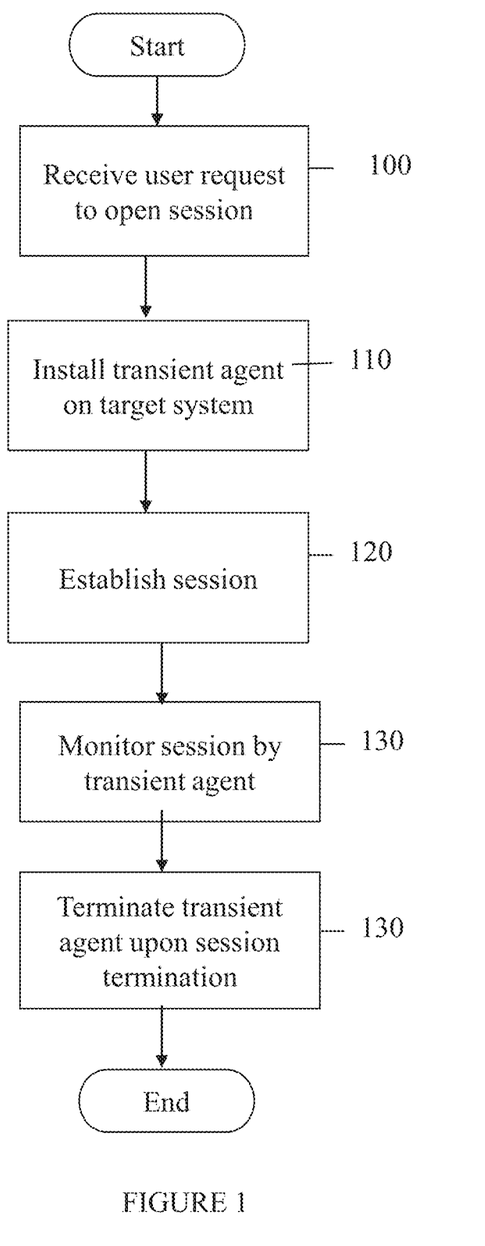
FIG. 1 is a simplified flowchart of a method for monitoring session events on a target system, in accordance with embodiments of the invention.

Reference is now made FIG. 1 which is a simplified flowchart of a method for monitoring session events on a target system using transient agents, in accordance with embodiments of the invention. Monitoring the target system provides information about events occurring on the target system during the session, even when these events could not be inferred from the operations of the user client.

In 100, a user request to open a session with said target system is received from a user client. In some embodiments the user request is received directly from the user client, possibly via a private network (e.g. organizational network). In other embodiments the user request is authenticated by a PAMS, which optionally provides additional information such as a session-specific user password.

In 110, a transient agent for monitoring the session is installed onto the target system. The transient agent is session-specific and remains active on the target system for the duration of the session.

Exemplary embodiments of how a transient agent may be installed remotely on a target system prior to establishing a session include:

I) Windows: Microsoft provides a framework for remote process execution known as PSExec. The transient agent is run as a remote process. The user client connects through the Proxy over RDP protocol.

II) Unix: Copy/inject commands over SSH Protocol on Unix. Over the SSH session, files are copied, and execution of a file to create a process may be forced (e.g. by injecting keystrokes of the executable by the proxy).

In further embodiments, a transient agent(s) is/are pre-installed on some of the target systems. The pre-installed transient agent is session-specific and is active only for the duration of a single session. The transient agent is activated when the session begins and deactivated when the session ends.

In 120, the session between the user client and the target system is established over a communication network. In some embodiments, the session is conducted via a proxy server (e.g. a Privileged Session Management Proxy which manages privileged sessions on the target system). The proxy server serves to isolate the user client from the target system, and may provide a focal point for monitoring the session from the client side of the session.

Some embodiments include authenticating the user client prior to establishing the session. For example, privileged credentials may be retrieved from a PAMS and/or user privileges for the given session may be determined and later used for controlling the session.

In 130, the session is monitored by the transient agent. The transient agent collects information about events occurring on the target system during the session.

In some embodiments information is collected by one or more of the following:

A) Contextual command-level auditing—Specific commands performed by the target system application are logged.

B) Video monitoring—Video recording of the session and the user client's interaction with the application. This recording may later be used for auditing and accountability.

C) Real-time monitoring—Another human user, user client, manager or monitoring application monitors the session and user client's interaction with the application in real-time. This is sometime referred to as "over-the-shoulder monitoring".

In some embodiments the transient agent monitors events including one or more of:
A) Processes launched;
B) Windows titles;
C) Key strokes;
D) Access to files and/or registry;
E) Mouse movements and clicks;
F) Text fields;
G) Command execution;
H) OS system calls;
I) Application API calls; and
J) Display content.

The information collected may be analyzed to detect security threats and prevent security breaches. For example, if an attempt to launch a restricted process is identified, the transient agent may prevent the launching, notify a system administrator, terminate the session and so forth.

In some embodiments, the transient agent reports the result of the session monitoring (i.e. all or part of the collected data) while the session is active. The reported information may be used by for session management and/or control. Such control may include terminating the session.

The transient agent may report the data at one or more of the following:
I) Continuously;
II) Periodically;
III) Upon query by a proxy server;
IV) When a specified event occurs;
V) When an attempt to exceed the session policy occurs; or
VI) When suspicious activity is detected.

In some embodiments, communication with the transient agent is performed over the main communication channel established between the user client and the target system for the session (possibly via a proxy server). In such embodiments, there is no need to establish a dedicated communication channel to the transient agent.

Exemplary embodiments of how a transient agent may report back over the main communication channel include:
I) For Windows session carries over the Remote Desktop Protocol (RDP), the report back can be done on top of the RDP protocol over a Virtual Channel. There is no need for new protocol. RDP allows "virtual channels" for sending custom data. The proxy reads this virtual channel custom data.
II) For SSH sessions, over the SSH channel itself (SSH). There is no need to open new protocol. The transient agent reports back over the opened SSH. The proxy knows how to read the "special" SSH packets, use it, and remove it so the SSH client is able to work transparently.

In some embodiments, the transient agent controls the session, possibly in coordination with a session management proxy. Session control may be based on a session policy (possibly provided by the session management proxy). The session policy defines events and operations which are permitted and/or restricted and/or forbidden during the session. The session policy may be session-specific and/or user-specific and/or general rules applicable to all users and sessions on the target system.

In some embodiments the transient agent controls one or more of:
A) Which files are accessed;
B) Which processes are launched;
C) Which network assets and/or addresses are accessed and/or which protocols are used;
D) Which registry keys are accessed;
E) Which windows are opened;
F) Which system calls are executed;
G) Which application APIs are run; and
H) What information is displayed/presented to the user.

In some embodiments, the transient agent terminates the session upon detection of non-allowed activity during the session.

In 140, the transient agent is terminated when the session is ended.

Some embodiments further include monitoring the transient agent. Actions may be triggered on the target system based on transient agent activity. Such actions may include one or more of:
I) Terminating the session;
II) Pausing the session;
III) Reactivating the transient agent;
IV) General alert; and In some embodiments transient agent activity is monitored, and if the transient agent is non-active the session is terminated.

Session Monitoring System

Figure 2:
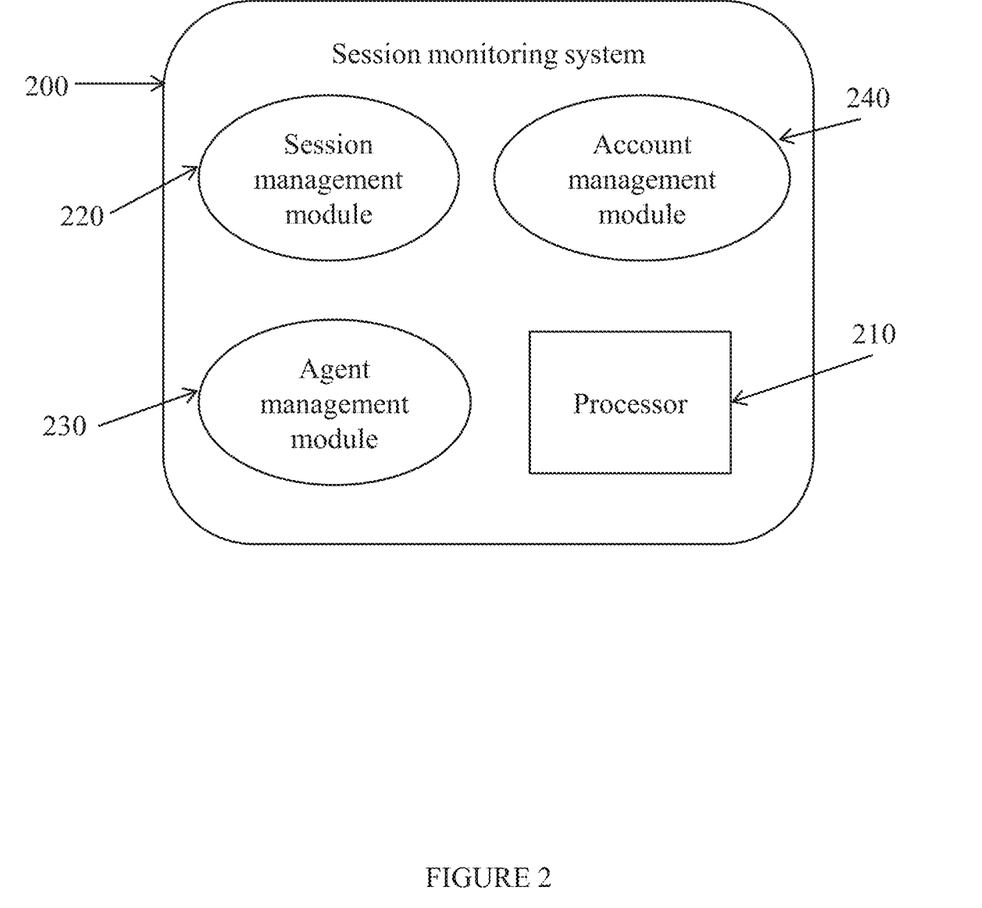
FIG. 2 is a simplified diagram of a session monitoring system, in accordance with embodiments of the invention.

Reference is now made FIG. 2 which is a simplified diagram of a session monitoring system, in accordance with embodiments of the invention. Session monitoring system 200 (also denoted monitoring system herein) includes one or more processor(s) 210. Monitoring system 200 executes one or more modules, including session management module 220 and agent management module 230. Some embodiments further include account management module 240.

Figure 3A:
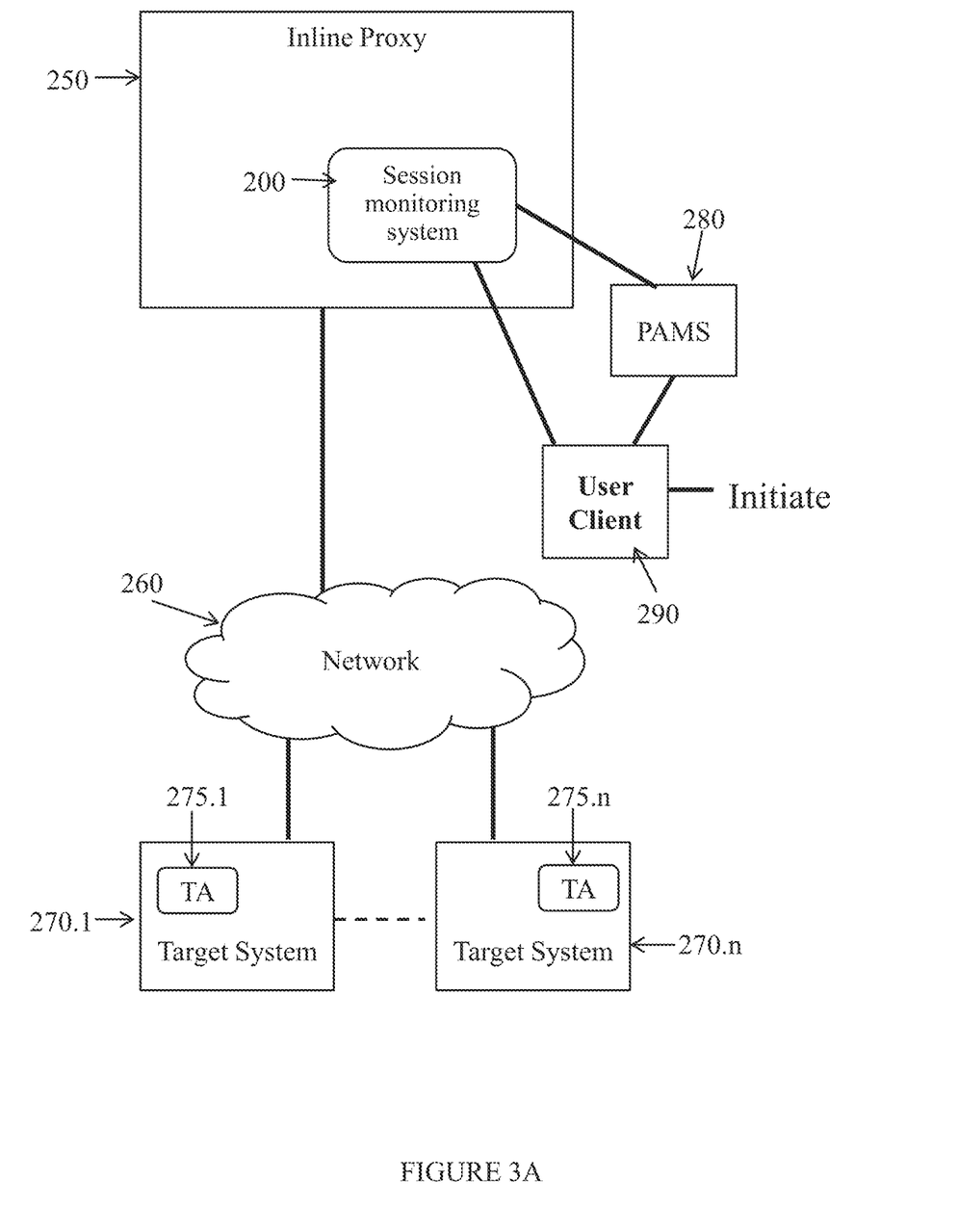
FIG. 3A is a simplified diagram of a session monitoring system in an inline proxy server, in accordance with embodiments of the invention.
Figure 3B:
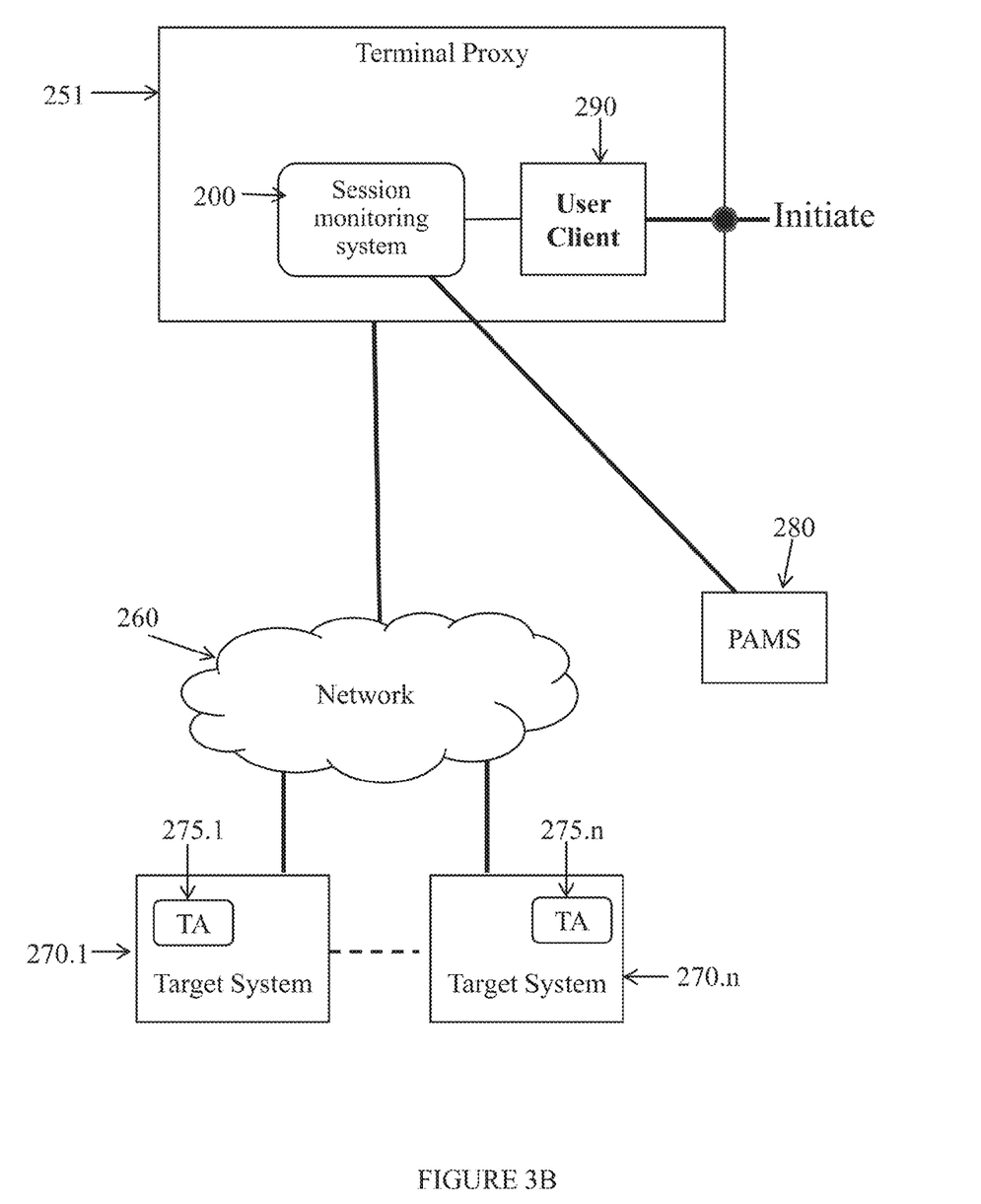
FIG. 3B is a simplified diagram of a session monitoring system in a terminal proxy, in accordance with embodiments of the invention.
Figure 3C:
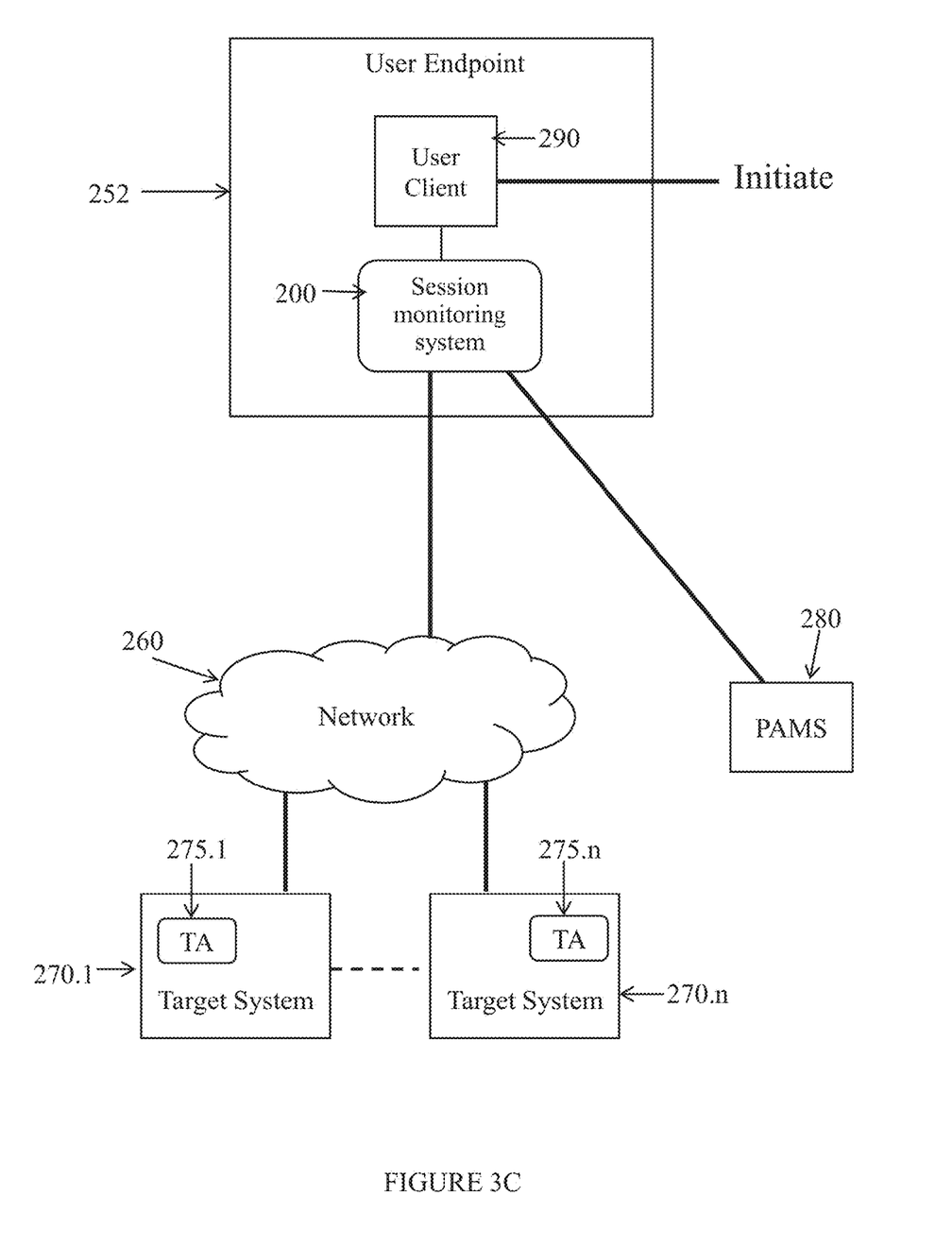
FIG. 3C is a simplified diagram of a session monitoring system in a local proxy, in accordance with embodiments of the invention.

Monitoring system 200 connects with one or more target systems 270.1-270.*n* over a network. FIGS. 3A-3C show non-limiting embodiments in which a single communication network 260 connects monitoring system 200, target system(s) 270.1-270.*n* and optionally PAMS 280. It is to be understood that in other embodiments communication may be implemented in other configurations and/or over multiple networks. For example, the user client may communicate with monitoring system 200 over an organizational network while monitoring system 200 communicates with some target systems over a VPN and other target systems over an external network. Similarly, monitoring system 200 may be accessible to user clients over multiple, private and/or public networks. Exemplary networks include a LAN or other external network, and/or a private network, such as a virtual private network (VPN), and/or an organizational network, according to some embodiments of the present invention.

For clarity, in the following the term "target system" (or "target system 270"), when used in the singular, means a particular target system being accessed by the user client for a given session. The term "transient agent" (or "transient agent 275"), means the transient agent upon the target system being accessed by the user client for the given session.

Session Management Module

Session management module 220 establishes and terminates sessions between user client 290 and the target system 270. In some embodiments, session management module 220 controls the session, based on at least one of the following:
1) Session policy;
2) Information collected by the transient agent; and
3) Non-contextual session information collected by monitoring user-end activity.

For example session management module 220 may enforce access control regarding which user clients may access a given target system 270 and by providing privileged single sign-on.

Agent Management Module

Agent management module 230 installs a session-specific transient agent 275 for monitoring the session onto target system 270 prior to establishment of the session, and terminates the transient agent upon termination of the session. Exemplary embodiments of installing the transient agent were described above. The transient agent monitors the session upon the target system and collects information about events occurring on the target system as described above. Session management module 220 may trigger agent management module 230 to terminate the transient agent when the session is ended.

In some embodiments, transient agent 275 returns the collected information back to monitoring system 200. Agent management module 230 receives the collected information from the transient agent. This information may be used by session management module 220 to control the session in accordance with a session policy, and possibly in conjunction with information collected at the client system. In some embodiments the session monitoring information returned by the transient agent is logged and stored.

In some embodiments, transient agent 275 controls the session from within target system 270 in accordance with session monitoring information.

Account Management Module

In some embodiments monitoring system 200 includes an account management module 240 which authenticates user credentials when the user client requests to establish a session. In some embodiments, account management module 240 establishes the session policy used for controlling the session.

In some embodiments, account management module 240 provides some or all of the functions of a Privileged Account Management System (PAMS). These functions include one or more of:

1) Determining user privileges;
2) Obtaining user credentials;
3) Managing user credentials; and
4) Obtaining connection credentials (such as passwords).

The functions and benefits of a PAMS are described in more detail below.

In some embodiments account management module 240 queries an external privileged account management system (PAMS) 280 for necessary security information, for example to obtain the session policy and/or session-specific user credentials for use during the session.

In some embodiments, communication between the transient agent and the monitoring agent is over the main communication channel established between proxy server 250 and target system 270.

Session monitoring system 200 serves as a monitoring and control point for the session. Reference is now made to FIGS. 3A-3C which show exemplary embodiments of how session monitoring system 200 may be integrated into the session. It is to be understood that although these embodiments are illustrated separately they are not exclusive. Multiple session monitoring systems integrated in different ways may be available for establishment of sessions.

As used herein the phrase "inline proxy" means that the user client runs on an endpoint machine and the target system runs on a separate server or machine. The protocol used to communicate between the user endpoint and the inline proxy is the same as the protocol between the inline proxy and the target system.

As used herein the phrase "terminal proxy" means that the user client runs on the terminal proxy and the protocol between the user endpoint and the proxy is a terminal protocol. Examples of terminal proxies are Microsoft Remote Desktop Services on which the terminal protocol is RDP, and Citrix XenApp on which the terminal protocol is ICA.

As used herein the phrase "local proxy" means that the proxy runs on the user endpoint machine together with the user client.

As used herein the term "initiate" seen in FIGS. 3A-3C means the command input to the user client to request a session. In some embodiments the initiator is a human user. In some embodiments the initiator is a computer entity.

Reference is now made to FIG. 3A which is a simplified diagram of a session monitoring system in an inline proxy server, in accordance with embodiments of the invention. Session monitoring system 200 runs on a proxy server. The initiate command is provided by the initiator directly to user client 290. User client 290 then sends a session request to the proxy server of session monitoring system 200.

Communication between user client 290 and target system 270 is routed via inline proxy 250. In the configuration of FIG. 3A, the communication channel may be considered to have two portions; the first portion connecting user client 290 and inline proxy 250 and the second portion connecting inline proxy 250 and target system 270.

Reference is now made to FIG. 3B which is a simplified diagram of a session monitoring system in a terminal proxy, in accordance with embodiments of the invention. Both session monitoring system 200 and user client 290 are run by terminal proxy 251. Communication between the initiator and terminal proxy 251 is with a terminal protocol. Communication between the user client that runs on terminal proxy 251 and target system 270 is with a separate protocol.

Reference is now made to FIG. 3C which is a simplified diagram of a session monitoring system in a local proxy, in accordance with embodiments of the invention. Both session monitoring system 200 and user client 290 are run on user endpoint 252. Session monitoring system 200 serves as a local proxy. Thus although the initiator has direct access to the endpoint (which connects to the target system over the main communication channel) user client 290 is isolated from target system 270.

Privileged Account Management

Privileged Account Management is a solution for managing privileged accounts. PAMS hold the credentials for the privileged account and a mapping of users (such as administrators) to permitted accounts, according to a policy defined by the organization. When a user client wants to use a specific target account (for example the "root" account on a Linux machine), the user client authenticates to PAMS, then retrieves the credentials for the target account and uses them for access.

It is noted that in some embodiments privileged account management is implemented as a module within the session monitoring system and/or as a separate PAMS on an external server. For clarity the following language is directed at non-limiting embodiments in which privileged account management is performed by a PAMS. Other embodiments implement some or all of the features below within the session monitoring system 200.

An important aspect of PAMS is the support of various workflows, such as managerial approval for password retrieval, correlation with ticketing systems, password replacement and so on. These workflows support organizational policy and procedures for network security and access control.

In some embodiments, after receiving the user request to establish a session, the session monitoring system 200 (optionally via proxy server 250) first authenticates to PAMS and obtains privileged credentials to initiate a privileged session from PAMS. The credentials do not pass through the user client and privileged credentials are not disclosed to the user client.

In some embodiments, PAMS provides secure and tamper proof storage of session monitoring information.

In some embodiments, PAMS is used as a secure repository for session policies (e.g. access control policies). These policies may be used by session monitoring system 200 for managing the session in conjunction with the monitoring information returned by the transient agent.

Integrating PAMS into embodiments of the present invention provides the following benefits:

A) PAMS facilitates monitoring of user client actions—by solely possessing the credentials required for accessing the target system, the proxy server presents a control point through which all connections are established. The session monitoring system 200 ensures that the transient agent is installed as required before the session is established. This enables monitoring at both the proxy and target system sides of the session, and subsequent auditing of all connections and communications between user clients and target systems.

B) PAM enables control over the session establishment—by functioning as a control point, PAMS may limit the times when the connections may be established, source (user client) and destination (target system) allowed for the connection, protocols valid for the connection, actions allowed and enforce other limitations, according to a preconfigured policy. The session monitoring system may also provide the transient agent with control information which enables the transient to control the session from the target system side. For example, if the transient agent identifies that the target system is displaying data which is not permitted for access by the given user client, the transient agent may terminate the session without waiting for the session monitoring system to identify forbidden user client actions or attempts to access protected data.

C) PAMS facilitates accountability for sensitive application sessions when a shared account is used—The user may authenticate a personal identity to PAMS, which in turn provides the session monitoring system with shared account information. This enables the session monitoring system to link between the identity used to access PAMS and the actions performed with the shared or privileged identity. This provides accountability, linking performed privileged actions to a specific user client.

D) The PAMS enables interference with actions performed through the sensitive application and even enables termination of the sensitive application session.

PAMS solves security problems including:

1) The human user or user client is aware and is in possession of the credentials—Thus if the user client is not well protected, the credentials may be hijacked and abused. For example, an attacker may use software that captures keystrokes and hijacks username/password combinations. Another example of a potential route of attack is for the attacker to extract credentials, such as access keys or credentials files, from the client applications and use them to gain access to the target system.

2) Difficulties with granting and denying access—Since the user client provides the credentials, both the user client and the target system need to be aware of them. If the target system is not informed when these credentials are changed (for example, due to a scheduled organizational passwords change) it may deny access to the user client.

3) Lack of accountability for shared account/identity usage—A shared account/identity is an account which may be used by more than one, specific user. This account usually represents a role on the client system, such as administrator, system, technician, application or other. When the authentication to the target system is done with a shared account, there is no indication of who the specific user was, which prevents accountability for performed actions. Often, these shared accounts are also privileged accounts, meaning that they enable actions which require specific privileges to be performed on target system.

4) Limitations on password complexity—In the case of human users, passwords are often of a low complexity, meaning that they are of a short length, use characters from a limited character set and use words and formats that are easier to find in comparison with a random or pseudo-random password of a similar length. Such "simple" passwords provide lesser protection to various attacks, such as brute-forcing, which involves trying multiple passwords to find the right one. Complex passwords are more secure, but are much more difficult for human users to remember and use.

5) Password reuse—Because the human users need to remember and use their passwords they often use the same one for multiple target systems, which means that a compromise of one target system may compromise another. A different, unique password for every target system is more secure, but is much more difficult for human users to remember.

In some embodiments, the credentials are not possessed by the human user or user client but are only known to PAMS. The user client's request to establish a session is not sent directly to the target system, but goes through the session monitoring system which serves as a proxy. The session monitoring system optionally performs some sort of authentication on the user client and the user request as described above. PAMS then provides the required security credentials to the proxy server which uses them to establish the session with the target system.

In some embodiments PAMS provides the session monitoring system with access policies, which describe, for example, the permitted time, source, destination and protocols for the session. These access policies may be enforced at the proxy server and/or by the transient agent installed on the target system.

PAMS negates the need for the user client's possession of the shared or privileged credentials, thus preventing an attacker or malicious user from hijacking and abusing them. This also facilitates the use of complex and unique passwords, as there is no need for the user to remember them. It is also now possible to change the credentials as often as required, as only the target system and the session monitoring system need to be aware of the new, changed credentials.

Exemplary Workflows with PAMS

A) In one exemplary workflow, the user, operating on a user client, authenticates to a PAMS using one set of credentials (e.g. his personal credentials identifying him to PAMS) and requests access to a sensitive application using a specific account. PAMS verifies that the user client has permissions to the sensitive application and authenticates the user client. A transient agent is installed on the target system and the session is established.

B) A more detailed exemplary workflow is as follows. An IT user needs to connect to a target system to perform a privileged operation (e.g. connect to a Window server over the RDP protocol using the Administrator account or connect to a Unix server over the SSH protocol using the root account). The IT user may initiate the session in the following ways:

—Open and authenticate to the PAMS access portal, select the server to connect to, and click the "Connect button". Clicking the connect button, redirects the user client to the Session Monitoring System to initiate a privileged session.

In some scenarios, the user client connects to the Session Monitoring System directly without passing through the PAMS access portal. The IT user specifies the target system to connect to and the target account to connect with. This saves the optional step of passing through the PAMS access portal, and simplifies the user interface. When connecting to the Session Monitoring System directly, the Session Monitoring System authenticates the user with PAMS and initiates a privileged session between the user client and the target system.

PAMS verifies whether the user client is authorized to connect to a target system with that specified privileged account.

The Session Monitoring System performs a check to verify that the transient agent was deployed successfully. The session may optionally be terminated the session in case of a failure to install.

PAMS provides a connection password to the Session Monitoring System. Alternatively, the user client provides the connection password directly. Optionally, PAMs also provides an access control policy.

The Session Monitoring System creates a session to target system.

The above-described embodiments provide significant benefits to an organization. Session monitoring utilizing a session-specific transient agent may be applied to a very wide range of applications without requiring workflow changes or any specific design of the controlled application. Control over privileged sessions may be achieved by controlling the user credentials, possibly in coordinate with a PAMS, and connecting through a secure proxy. Some embodiments enable "Privileged Single Sign-On" which automatically connects the user client to the target system with privileged credentials without the divulging the privileged credentials to the human user or user client. User clients are isolated from target systems by forcing them to pass through a proxy. The transient agent may report back to the proxy over the privileged session connection without the need to open additional communication channel to report back to the proxy.

The methods as described above may be used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant operating systems, networks, target systems and applications, proxy servers, PAMS and agents will be developed and the scope of the respective corresponding terms is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of monitoring session-specific operations in system events, comprising:
    at a proxy server:
        receiving, from a user client at an endpoint machine, a request for communication with a target system running on a separate machine;
        in response to said request, installing on said separate machine a session-specific transient agent operating on said separate machine for a specific session of said target system to collect information of events occurring upon said target system during said specific session and to terminate upon termination of said specific session;
        upon activation of said transient agent on said separate machine, establishing a session between said user client endpoint machine and said target system running on said separate machine;
        receiving, from said session-specific transient agent during said specific session, collected information of events occurring on said target system during said specific session;
        collecting, from communication routed through said proxy server between said user client and said target system, information associated with said specific session;
        generating combined information for said specific session from said information received from said session-specific transient agent and said information collected from said communication routed through said proxy server; and
        controlling said specific session, based on said combined information, to keep events on said target system in accordance with a session policy.

2. A method according to claim 1, further comprising routing said specific session via said proxy server so as to isolate between said user client and said target system.

3. A method according to claim 1, further comprising monitoring transient agent activity and triggering action on said target system in accordance with said transient agent activity.

4. A method according to claim 3, wherein said triggered action includes at least one of: alerting, terminating said specific session, pausing said specific session, reactivating said transient agent and general alert.

5. A method according to claim 1, further comprising monitoring transient agent activity and terminating said specific session if said transient agent is non-active.

6. A method according to claim 1, further comprising logging said collected information to enable at least one of real-time monitoring and later analysis of said events.

7. A method according to claim 1, wherein controlling said specific session is further performed by said transient agent.

8. A method according to claim 1, further comprising terminating said specific session in response to session events which exceed said session policy.

9. A method according to claim 8, wherein said terminating is performed by said transient agent.

10. A method according to claim 1, wherein communication with said transient agent is over a main communication channel established between said user client and said target system for the performance of said specific session.

11. A method according to claim 1, further comprising authenticating said user client prior to said establishing, determining respective user privileges for said specific session and performing said controlling said specific session in accordance with said user privileges and said monitoring.

12. A method according to claim 1, wherein said transient agent is pre-installed on said target system, and said installing comprises activating said transient agent for a duration of said specific session.

13. A method according to claim 1, wherein said events include at least one of: processes launched, window titles, key strokes, access to files and/or registry, mouse movements and clicks, text fields, command execution, OS system calls, application API calls and display content.

14. A session monitoring system configured for monitoring session-specific operations in system events, comprising:
    at least one non-transitory computer readable storage medium storing instructions; and
    at least one processor configured to execute said instructions to:
        receive, from a user client at an endpoint machine, a request for communication with a target system running on a separate machine;
        in response to said request, install a session-specific transient agent on said separate machine for a specific session of said target system to collect information of events occurring upon said target system during said specific session and to terminate upon termination of said specific session;
        upon activation of said session-specific transient agent on said separate machine, establish a specific session between said user client endpoint machine and said target system running on said separate machine; and
        receive from said session-specific transient agent collected information of events occurring on said target system during said specific session;
        collect, from communication routed through a proxy server between said user client and said target system, information associated with said specific session;
        generate combined information for said specific session from said information received from said session-specific transient agent and said information collected from said communication routed through said proxy server; and
        control said specific session, based on said combined information, to keep events on said target system in accordance with a session policy.

15. A system according to claim 14, wherein said transient agent communicates said collected information back for at least one of: continuously, periodically, upon query by a proxy server, when a specified event occurs, when an attempt to exceed the session policy occurs or when suspicious activity is detected.

16. A system according to claim 14, wherein said specific session is further controlled upon said target system by said transient agent, in accordance with said collected information of events occurring on said target system during said specific session and said session policy.

17. A system according to claim 14, wherein said controlling said specific session comprises control of: which files are accessed, which processes are launched, which network assets and/or addresses are accessed and/or which protocols are used, which registry keys are accessed, which windows are opened, which system calls are executed, which application APIs are run, and what information is displayed and/or presented to the user.

18. A system according to claim 14, wherein said session monitoring system runs on a proxy server isolating between said user client and said target system.

19. A system according to claim 18, wherein said session monitoring system runs on a user endpoint machine directly accessible to an initiator of said specific session.

20. A system according to claim 14, wherein said session monitoring system runs on an inline proxy server between said user client and said target system, and wherein said specific session is routed via said inline proxy server.

21. A system according to claim 14, wherein said session monitoring system runs on a terminal proxy, and wherein said terminal proxy further runs said user client such that an initiator of said specific session accesses said user client with a terminal protocol.

22. A system according to claim 14, wherein said at least one processor is further configured to execute instructions to authenticate respective user credentials upon receipt of said request for communication with said target system.

23. A system according to claim 22, wherein said at least one processor is further configured to execute instructions to query a privileged account management system (PAMS) to obtain session-specific user credentials for use during said specific session.

24. A system according to claim 22, wherein said at least one processor is further configured to execute instructions to establish said session policy, and wherein said session policy comprises user privileges for said specific session.

25. A system according to claim 22, wherein said at least one processor is further configured to execute instructions to establish session-specific user credentials for use during said specific session.

26. A system according to claim 14, wherein communication between with said transient agent is over a main communication channel established with said target system for the performance of said specific session.

27. A system according to claim 14, wherein said at least one processor is further configured to execute instructions to trigger termination of said transient agent upon termination of said specific session.

28. A computer program product for monitoring session-specific operations in system events, comprising:
a non-transitory computer readable storage medium;
first program instructions to receive from a user client at an endpoint machine, a request for communication with a target system running on a separate machine;
second program instructions to install on said separate machine, in response to said request, a session-specific transient agent operating on said separate machine for a specific session of said target system to collect information of events occurring upon said target system during said specific session and to terminate upon termination of said specific session;
third program instructions to establish said specific session between said user client endpoint machine and said target system over a communication network;
fourth program instructions to receive, from said session-specific transient agent, collected information of events occurring upon said target system during said specific session;
fifth program instructions to collect, from communication routed through a proxy server between said user client and said target system, information associated with said specific session;
sixth program instructions to generate combined information for said specific session from said information received from said session-specific transient agent and said information collected from said communication routed through said proxy server;
seventh program instructions to control said specific session, based on said combined information, to keep events on said target system in accordance with a session policy; and
eighth program instructions to terminate said transient agent in response to a termination of said specific session,
wherein said first, second, third, fourth, fifth, sixth, seventh and eighth program instructions are stored on said non-transitory computer readable storage medium.

* * * * *